Patented Aug. 19, 1941

2,252,921

UNITED STATES PATENT OFFICE 2,252,921

PROCESS FOR PREPARATION OF VITAMIN B₁

Zoltán Földi and Árpád Gerecs, Budapest, Hungary

No Drawing. Application January 7, 1941, Serial No. 373,518. In Hungary January 25, 1940

6 Claims. (Cl. 260—251)

Several methods are already known for preparing vitamin $B_1$. One of them is starting from ready made thiazoles and is bringing these into reaction with suitably substituted pyrimidine derivatives, such pyrimidine derivatives carrying a halogeno-methyl, or a hydroxy-methyl, or alkoxy-methyl group in position 5. (See e. g. the British specification 496,726, the German specification 669,187, the German specification 685,032 and the U. S. A. specification 2,209,244.) In another known process (see e. g. specification No. 471,416) suitably substituted 5-thioformamidomethyl pyrimidines are condensed with an ester of a γ-aceto-γ-halogeno-propyl alcohol. Still another process consists in condensing an afore mentioned thioformamidomethyl - pyrimidine with 2 - methyl - 2 - alkoxy-3-halogeno-tetrahydrofurane. (See e. g. U. S. A. specification No. 2,127,446.)

The process referred to above became known partly by the scientific and partly by the patent literature. From the scientific literature it seems established, that the γ-aceto-γ-halogeno-propyl-alcohols do not form vitamin $B_1$ on treatment with the substituted 5-thioformamidomethyl-pyrimidines. Thus, for instance, Todd and Bergel mention in a research paper of theirs (published in the Journal of the Chemical Society, 1937, pp. 364–367) inter alia: "Compounds (I)" (i. e. 2-methyl-4-amino-5-thioformamido-methyl-pyrimidine) "and (II; R=H)" (i. e. γ-aceto-γ-chloro-propyl alcohol) "did not yield aneurin when heated together in dioxan solution, but when a mixture of the two compounds alone was heated at 140° reaction occurred with considerable darkening and resinification. From the product a substance was isolated in poor yield which had the properties of aneurin. The low reactivity of the hydroxyketone (II; R=H)" (the γ-aceto-γ-chloropropyl alcohol) "which probably exists mainly in the cyclic oxide form, has already been mentioned."

It is apparent from the above quotation, as also from other statements, that until now vitamin $B_1$ could not be prepared by the interaction of a corresponding thioformamidomethyl-pyrimidine and γ-aceto-γ-chloropropyl alcohol. Also Todd and Bergel found in their above paper necessary to use the acetic ester of the γ-aceto-γ-chloro-propyl alcohol in the condensation of 5-thioformamidomethyl-pyrimidine to vitamin $B_1$ and even in this case the yield was inconsiderable.

Our experiments have led to the observation that the compound which is known in the literature as γ-aceto-γ-halogeno-propyl alcohol, which has, however, the cyclic form of 2-methyl-2-hydroxy-3-halogenotetrahydrofurane is able to produce in excellent yields vitamin $B_1$, if the reaction is carried out, in the presence of salts of weak organic bases formed with strong acids. The importance of such salts emerges clearly from the following comparison: while Todd and Bergel were unable to obtain vitamin $B_1$ from 2-methyl-4-amino-5-thioformamidomethyl-pyrimidine and γ-aceto-γ-chloro-propyl alcohol in dioxane solution, the present process gives, carrying out the same reaction in the presence of pyridine hydrochloride and using the very same starting materials, excellent yields of vitamin $B_1$.

In the following description for the γ-aceto-γ-halogeno-propyl alcohol the name of 2-methyl-2-oxy-3-halogenotetrahydrofurane, i. e. the name of the cyclic form is used and similarly for the γ-aceto-γ-chloro-propyl alcohol the name of 2-methyl-2-oxy-2-chloro-tetrahydrofurane. This latter substance can be obtained from α-chloro-α-aceto-butyrolacton in the way which is given in the literature (see Journ. Amer. Chem. Soc., vol. 58, p. 1804) for the obtention of γ-aceto-γ-chloro-propyl alcohol with the remark, however, that the raw γ-aceto-γ-chloro-propyl alcohol is preferably to be subjected in a high vacuo to a careful fractional distillation and that fraction is preferably to be used which boils at 100–103° under a pressure of about ½ mm. Hg. This fraction shows on the test of Zerewitinoff for active hydrogen only very inconsiderable amounts of active hydrogen.

The salts, that are according to our invention necessary for the reaction, are preferably salts of weak tertiary bases like pyridine, quinoline, dimethylaniline. As acid components of these salts preferably haloid-acids or other strong mineral acids or organic acids, as e. g. benzene sulphonic acid, can be taken. As, however, vitamin $B_1$ is used in form of its hydrochloride, one may use preferably hydrochlorides of weak bases.

The reaction is carried out preferably at temperatures between 50–110°. At higher temperatures side-reactions are likely to take place. At lower temperatures, however, the duration of the reaction is to be prolonged. It was found practical to carry out the condensation in 10–25 hours at about 70° or in 35–50 hours at 50–55°. Of course, considerable quantities of vitamin $B_1$ are formed even in much shorter time.

The salts of weak bases with strong acids, like pyridine-hydrochloride, or dimethylaniline-hydrochloride, are suitably employed in such quantities, that they can take over also the part of a solvent or diluent: e. g. to 1 part of 2-methyl-4-amino- 5 -thioformamido-methyl-pyrimidine 2–6 parts of pyridine-hydrochloride or dimethylaniline-hydrochloride are added. To these solvents certain additions, such as chloroform, dioxane or small amounts of water, or also ethyl alcohol or methyl alcohol may be utilised.

An advantageous form of the process should be given here: One part of 2-methyl-4-amino-5-thioformamidomethylpyrimidine is heated to about 80° together with about 3 parts of distilled pyridine-hydrochloride and about 0.4 part of water and with about 1–1.4 part of aceto-chloro-propyl alcohol (2-methyl-2-hydroxy-3-chloro-tetrahydrofurane). The mass is mixed over until it becomes practically homogeneous, after which the solution is subjected to further heating to 70° for 15–20 hours, or to 50° for 45 hours. Into the above mixture also about 0.8 parts (related to the amount of the thioformamidomethyl-pyrimidine compound) of absolute alcohol and/or 0.05–0.12 part of pyridine may be added. Instead of pyridine-hydrochloride also dimethyl-aniline-hydrochloride can be employed.

In course of the heating vitamin $B_1$ separates in form of a crystal mass. At lower temperatures the coloration of the mixture is of lesser degree than at higher temperatures.

The reaction mixture is worked-up in a simple way. Small amounts of absolute alcohol are added to, mixed over and, if necessary, heated for a short while, then absolute alcohol containing hydrogen chloride is added and after some standing the separated hydrochloride of the vitamin is pressed up on a Büchner funnel. If the reaction was carried out at low temperature, the vitamin-hydrochloride is a nearly colorless crystal powder. Samples of vitamin obtained from reaction conducted at higher temperatures are contaminated by minute amounts of tarry material. This contamination can be removed, however, by dissolving the hydrochloride in a little water and filtrating. Purification through the picrate or the picrolonate is in this process wholly superfluous. The yields are excellent; from 1 part of thio-formamido-methyl-pyrimidine 1–1.3 parts by weight of vitamin can be obtained.

Further details of the process can be seen from the following examples:

(1) 1 ccm. of dry pyridine is mixed with 2 ccm. of abs. alcohol which contains 25% of hydrogen chloride and then the alcohol is removed by distillation and the residue is heated in vacuum until the weight becomes constant. The residue (about 1.55 g. of pyridine-hydrochloride) is mixed then with 0.5 g. of 2-methyl-4-amino-5-thioformamidomethyl-pyrimidine and 0.6 ccm. of alcohol (aceto-chloro-propyl alcohol). The mixture is now brought to melting by heating to 80° while thoroughly mixing, and this faintly colored solution is kept at 70° for 18 hours in an incubator. After 3 hours the separation of the vitamin begins already in form of a crystal mass. After the 18 hours of incubation, the mixture is mixed with 3 ccm. of abs. alcohol and 0.3–0.5 ccm. of alcohol containing 25% of hydrogen chloride heated for a short while on a steam-bath and chilled afterwards in ice-water. The crystal mass is then filtered on a glass filter and washed with absolute alcohol. 0.62 g. of a slightly grey crystal powder of the m. p. 245° is obtained. If the product is dissolved in water, filtered, the water removed in vacuum and the residual crystal mass is mixed with abs. alcohol and suctioned, the vitamin is obtained as a colorless crystal-powder.

(2) One proceeds exactly as described in Example 1, however, using distilled pyridine hydrochloride (1.5 g.). Furthermore about 0.2 ccm. of water are added to the reaction mixture. One observes on the beginning of the heating 2 layers which disappear on shaking for a short time in a glycerine bath of 80°. The reaction and the art of working-up the mixture is carried out in the same manner as described in the foregoing example. One obtains 0.67 g. of vitamin having a melting point of about 239–240° C. It can be separated from the slightly coloring by-products by recrystallizing from aqueous alcohol or by the method of the foregoing example.

(3) 0.5 g. of 2-methyl-4-amino-5-thioform-amidomethylpyrimidine, 3 g. of distilled pyridine-hydrochloride and 0.6 ccm. of 2-methyl-2-hydroxy-3-chloro-tetrahydrofurane are melted at about 80° to a homogeneous solution which is then kept on about 70° for 15–20 hours in an incubator. The working-up of the mixture is carried out by the methods of the foregoing examples. One obtains 0.52–0.55 g. of vitamin, having a melting point of about 242° C. Further quantities of vitamin can be obtained from the mother liquors.

(4) 1 g. of anhydrous pyridine is mixed with 2 ccm. of abs. alcohol containing a quantity of hydrogenchloride equivalent to the pyridine. 0.5 g. 2-methyl-4-amino -5- thioformamido-methyl-pyrimidine and 0.6 g. of 2-methyl-2-hydroxy-3-chloro-tetra-hydrofurane ($\gamma$-aceto-$\gamma$-chlorpropyl alcohol) are added. One increases the temperature of the mixture during about 2½ hours slowly from 50° to 80°. The mixture is kept then for ½–1 hour at 80°, then it is kept in an incubator at 70° overnight. To the reaction mixture from which the vitamin has been crystallized out in rich quantity few ccm. of abs. alcohol and little abs. alcohol containing hydrochloride gas are added. After standing and cooling the crystals are filtered by suction. About 0.43–0.47 g. of crystals of vitamin are obtained. The product melts at about 239–240° C. and can be, if wanted, purified by the methods described in the foregoing examples. Further quantities of vitamin can be isolated from the mother liquors.

(5) 1.5 g. distilled pyridine hydrochloride, 0.5 g. 2-methyl-4-amino-5-thioformamidomethyl-pyrimidine and 0.6 g. of 2-methyl-2-hydroxy-3-chloro-tetrahydrofurane are melted and homogenized at 70°. The obtained pale yellow reaction mixture is kept for 45 hours in an incubator at 50°. The reaction mixture crystallizes; its working-up is carried out as described in the foregoing examples. One obtains about 0.5–0.55 g. of vitamin melting at about 240°. Further quantities of vitamin can be won from the mother liquors.

(6) Starting from 1.3 g. quinoline and from abs. alcohol containing hydrogenchloride gas the quinoline hydrochloride is prepared and the diluent is removed in vacuo. 0.5 g. 2-methyl-4-amino-5-thioformamidomethyl-pyrimidine and 0.6 g. of 2 - methyl-2-hydroxy-3-chloro-tetrahydrofurane are added to the hydrochloride. The reaction mixture homogenized by heating is kept for 16 hours at 70°. The working-up of the mixture is carried out in analogous manner with the methods described in the foregoing examples. One obtains 0.4 g. of vitamin melting at about 239° C. Further quantities of vitamin can be recovered by evaporation of the alcoholic mother liquors and by dissolving the residue in water and ether and by evaporating the filtered aqueous solution and by crystallizing the residue from alcohol.

(7) 1.5 g. distilled pyridine-hydrochloride, 0.5 ccm. of alcohol, 0.5 g. of 2-methyl-4-amino-5-thioformamidomethyl-pyrimidine, 0.6 g. of 2-methyl - 2 - hydroxy - 3 - chloro-tetrahydrofurane and 2 drops (about 0.04 g.) of dry pyridine are heated, while stirring, to 50°. The components of the reaction are slowly dissolved; subsequently the solution is kept for 45 hours in an incubator of 50°. The vitamin begins to crystallize already after 20 hours in rich quantity. The working-up of the reaction mixture is carried out in the same manner as described in the abovestanding examples. The first crystal generation furnishes 0.41–0.45 g. of vitamin. Out of the mother liquors further quantities of vitamin can be obtained.

(8) Starting from 1.2 g. dimethyl-anilin and alcoholic hydrochloric acid dimethyl-anilin hydrochloride is prepared. On elimination of the diluent 1.8 g. of an oily residue is obtained; (a small test portion of it blues wet congo-paper). To this oil 0.5 g. 2-methyl-4-amino-5-thio-formamido-methyl-pyrimidine, 0.6 ccm. of 2-methyl - 2 - hydroxy - 3-chloro-tetrahydrofurane are added; by heating gently a homogenized solution is prepared which is kept then for 20 hours in an incubator of 70°. The reaction mixture, thus obtained, is a deep violet red and partly crystallized mass. One obtains on working up by the methods described in the foregoing examples 0.62–0.70 g. of small shiny crystals of vitamin melting at 243° C.

(9) The reaction mixture corresponds to the Example 2, but one uses 1 ccm. dioxan instead of 0.2 ccm. water. The reaction mixture consists, also during the heating, of two layers. The duration of the heating is about 20 hours at 70°. One obtains after the methods of the foregoing examples about 0.55 g. of vitamin, which melts at 245° C.

(10) The reaction mixture corresponds to the preceding example, but one uses 1.5 ccm. chloroform instead of dioxan. On heating the mixture becomes homogeneous. The duration of heating as well as the temperature of the reaction corresponds to that of the preceding example. The vitamin obtained weighs 0.53–0.58 g. Melting point 240–242° C.

(11) One prepares out of one part of dry pyridine and of abs. ethylalcohol containing hydrochloric acid gas the chlorhydrate, which is carefully freed from diluent in vacuo. 0.5 parts 2-methyl-4-amino-5-thioformamidomethyl - py - rimidine and 0.6 part of 2-methyl-2-hydroxy-3-chloro-tetrahydrofurane are added. The mixture is heated under stirring for an hour gradually to 80° and is kept for another 3–4 hours at this temperature. Towards the end of the heating the vitamin crystallizes out. One adds 3–5 ccm. of abs. alcohol and a little alcohol containing hydrochloric acid gas. After standing and cooling the crystals of vitamin are collected by suction. One obtains the vitamin in form of snow-white crystals M. P. at about 242–245°.

It is a great advantage of the process, that according to this invention excellent yields are obtained also when carrying out the present process in industrial scale. The yields are even then excellent, when the starting materials are used in thousand-fold or more of the quantities given in the examples.

In the interval between the convention date and the filing date of this specification a paper has been published by Stevens and Setin in the Journal of the American Chemical Society, vol. 62, pp. 1040–1049, in which paper the authors have shown that the so-called aceto-chlor-propyl alcohol, which has been supposed to exist mainly in the cyclic oxyd form, is in the reality an ether derivative of the 2-2-oxy-methyl-3-chloro-tetrahydrofurane, namely the γ-aceto-γ-chloro-propyl ether derivative. According to this statement the real chemical structure of the compound, which has been designated in the preceding examples as 2-methyl-2-hydroxy-3-chloro - tetrahydrofurane, is such a one in which the hydroxy group in position 2 is not all free, but etherified with γ-aceto-γ-chloro-propyl alcohol. This new statement relates, however, merely to a question of nomenclature, altering not at all either the method for the obtainment of this starting material or the reaction conditions given in the preceding examples. Of course, it is also possible to utilise in the present process—as starting material—such a 2 - methyl-2-hydroxy-3-chloro-tetrahydrofurane γ-aceto-γ-chloro-propyl ether, which has been prepared exactly according to Stevens and Stein.

What we claim is:

1. A process for preparing vitamin $B_1$, which comprises the subjecting of 2-methyl-4-amino-5-thioformamidomethyl-pyrimidine, in the presence of salts of weak organic bases formed with strong acids, to the action of 2-methyl-2-hydroxy-3-halogeno-tetrahydrofurane.

2. A process for preparing vitamin $B_1$, which consists in subjecting 2-methyl-4-amino-5-thioformamidomethyl-pyrimidine, in the presence of salts of weak organic bases formed with strong acids, to the action of such a fraction of 2-methyl - 2 - hydroxy - 3 - chloro-tetrahydrofurane, which fraction shows on test of Zerewitinoff for active hydrogen only very inconsiderable amount of active hydrogen.

3. A process for preparing vitamin $B_1$, which consists in subjecting 2-methyl-4-amino-5-thioformamidomethyl-pyrimidine, in the presence of salts of weak organic bases formed with strong acids, to the action of such a fraction of 2-methyl - 2 - hydroxy - 3 - chloro-tetrahydrofurane, which fraction distils at about 1/2 mm. Hg. pressure at 100–103°.

4. A process for preparing vitamin $B_1$, which consists in subjecting 2-methyl-4-amino-5-thioformamidomethyl-pyrimidine, in the presence of salts of weak organic bases formed with strong acids, to the action of products resulting from α-chloro-α-aceto-butyrolactone by methods effecting a hydrolytic opening of the furane ring and a simultaneous decarboxylation.

5. In the preparation of vitamin $B_1$ by interaction of 2-methyl-4-amino-5-thioformamido-methyl-pyrimidine, in the presence of salts of weak organic bases formed with strong acids, and of a 2-methyl-2-hydroxy-3-halogeno-tetra-hydrofurane the use of a member of the group consisting of pyridine hydrochloride, dimethylaniline hydrochloride.

6. A process as claimed in claim 5, in which a member of the group consisting of pyridine hydrochloride, dimethyl-aniline hydrochloride is used as medium for the reaction.

ZOLTÁN FÖLDI.
ÁRPÁD GERECS.